Patented Feb. 20, 1923.

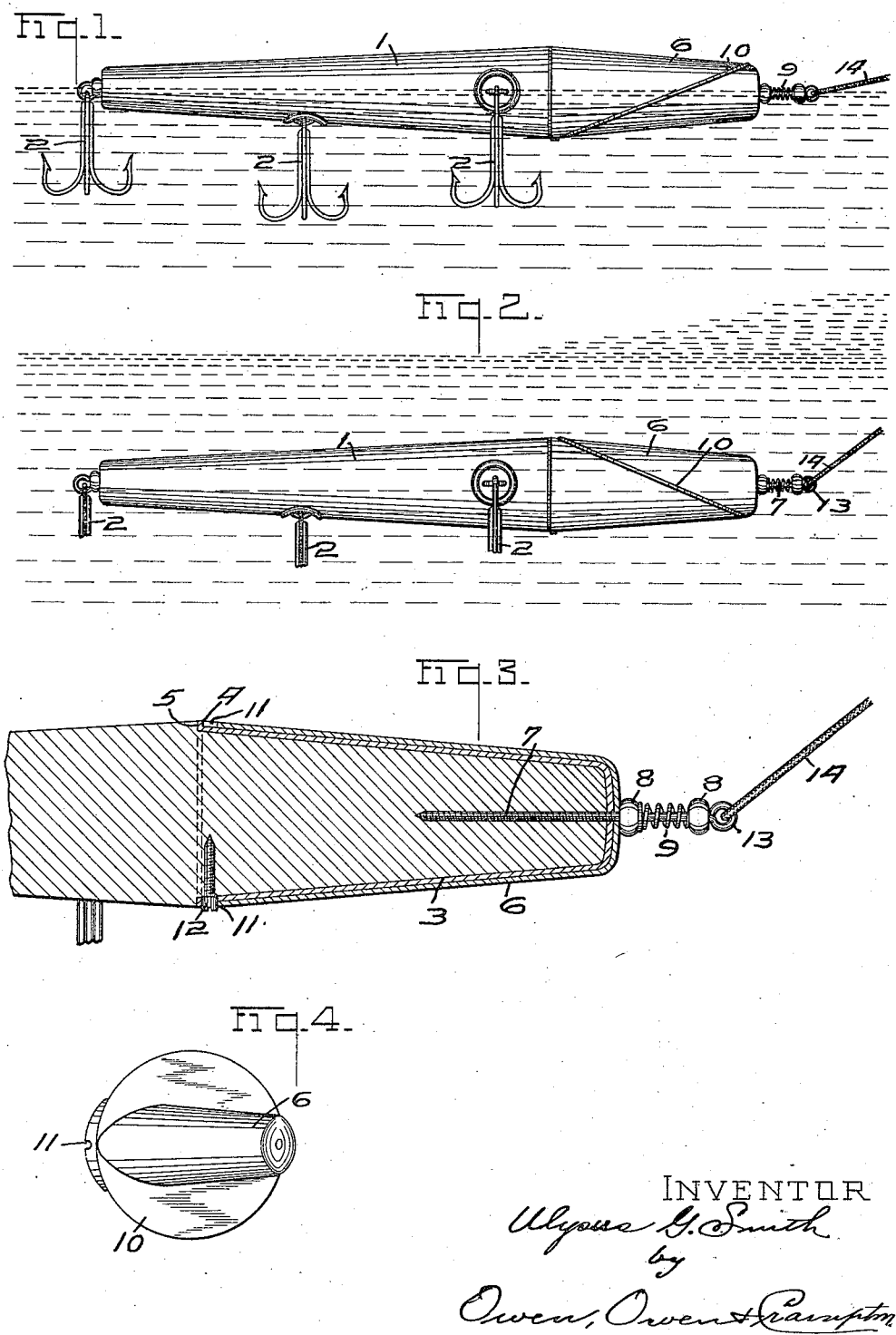

1,445,916

UNITED STATES PATENT OFFICE.

ULYSUS G. SMITH, OF FAYETTE, OHIO.

ARTIFICIAL BAIT.

Application filed September 19, 1921. Serial No. 501,744.

*To all whom it may concern:*

Be it known that I, ULYSUS G. SMITH, a citizen of the United States, and a resident of Fayette, in the county of Fulton and State of Ohio, have made an invention appertaining to Artificial Bait; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an artificial bait having a pair of fins located on opposite sides of the head of the bait and in a plane inclined to the axis or center line of the bait. Means is also provided for changing the position of the plane of the fins to vary the results produced.

Baits containing my invention may partake of different forms. To illustrate a practical application of the invention I have selected a bait embodying the invention and shall describe it hereinafter. The bait selected for purposes of illustration is shown in the accompanying drawings.

Figure 1 is a side view of the bait showing the head fins located in one position. Fig. 2 is also a side view but showing the fins in another position. Fig. 3 is a sectional view through the head of the bait. Fig. 4 is a top view of the fins.

1 in the figures is the body of the bait, which may be formed of wood if made solid, or of aluminum or other sheet material if made hollow. It may be formed of any material provided it is properly weighted or balanced so as to take a substantially horizontal position when placed in water. The body may be provided with hooks 2 of the type commonly used in connection with such bait.

The body is made substantially torpedo shape and is provided at its forward end with a shell 3 that encloses the forward end beginning at the major diameter of the body. It is provided with a flange 4 that sets into a shoulder 5 and a second shell 6 fits over the inner shell 3 and is spring pressed against the flange 4. A threaded pin 7 is secured either in the body 1 of the bait or in the shell 3, if the body 1 is hollow. A pair of beads 8 are located on the pin 7 and a spring 9 is located intermediate the beads 8. The spring 9 operates to yieldingly press the shell 6 against the flange 4 and the shell 3.

The shell 6 is provided with a pair of fins 10 that are circular in form and are located in a plane extending at an angle to the axis of the head of the artificial bait. The fins 10 when placed in position form a circular disc that is intersected by or through which the head protrudes at an angle as shown in Fig. 4. The angle of the plane of the disc relative to the axis of the artificial bait may be varied according to the results desired. As shown in Figs. 1 and 2, the angle of the plane of the disc is about 25° to the axis of the bait, which is the preferred relation between the bait and the fins. When the disc is placed at about this angle the disc will cause the bait to respond accurately to the pull on the line when pulled by a force equal to about that which is commonly exerted in drawing such a bait after being cast to cause the bait when the disc is inclined forward and down to descend a depth that will approximate one-fourth the length of the line, so that if a line of forty feet is used the bait when drawn will immediately descend to a depth of about ten feet. In this way the depth of the bait may be regulated to prevent the hooks catching with vegetation if the depth of the vegetation is known. However, if it is desired to maintain the bait at the surface the shell 6 may be rotated so as to place the disc at the angle shown in Fig. 1.

In order to maintain the shell 6 in the position that it is rotated the shell is provided with notches 11 and the pin 12 is secured in the body of the bait or in the shell 3. The notches 11 fit over the head of the pin 12. In order to secure the disc shaped fins 10 in any desired position the shell 6 is pulled from the bait against the elasticity of the compression spring 9 and then turned so that either notch 11 will engage with the head of the pin 12. The pin 7 is provided with an eye 13 to which the line 14 may be connected.

I claim:

1. In an artificial bait, a shell surrounding the forward end of the bait, a disc of sheet metal through which the forward end of the artificial bait protrudes located at an angle to the axis of the shell and having a diameter substantially equal to the major axis of the oval formed by the intersection of the shell with the disc.

2. In an artificial bait, a shell surrounding the forward end of the bait, a disc of sheet metal through which the forward end of the artificial bait protrudes located at an angle of about 25° to the axis of the shell and having a diameter substantially equal to the major axis of the oval formed by the intersection of the shell with the disc.

3. In an artificial bait, a rotatable shell surrounding the forward end of the bait, a disc of sheet metal through which the forward end of the artificial bait protrudes located at an angle to the axis of the shell and having a diameter substantially equal to the major axis of the oval formed by the intersection of the shell with the disc.

4. In an artificial bait, a rotatable shell surrounding the forward end of the bait, a disc of sheet metal through which the forward end of the artificial bait protrudes located at an angle to the axis of the shell and having a diameter substantially equal to the major axis of the oval formed by the intersection of the shell with the disc, and means for securing the shell in different positions on the bait.

In testimony whereof, I have hereunto signed my name to this specification.

ULYSUS G. SMITH.